(12) United States Patent
Nagaraja et al.

(10) Patent No.: US 7,921,206 B2
(45) Date of Patent: Apr. 5, 2011

(54) VISIBILITY AND CONTROL OF WIRELESS SENSOR NETWORKS

(75) Inventors: Kiran Nagaraja, Monmouth Junction, NJ (US); Vijay Raghunathan, West Lafayette, IN (US); Florin Sultan, Princeton, NJ (US); Srimat Chakradhar, Manalapan, NJ (US); Nupur Kothari, Los Angeles, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 278 days.

(21) Appl. No.: 12/105,303

(22) Filed: Apr. 18, 2008

(65) Prior Publication Data

US 2008/0320130 A1 Dec. 25, 2008

Related U.S. Application Data

(60) Provisional application No. 60/912,489, filed on Apr. 18, 2007.

(51) Int. Cl.
*G06F 15/173* (2006.01)
*G06F 9/44* (2006.01)
*G06F 9/45* (2006.01)
*G06F 3/00* (2006.01)

(52) U.S. Cl. ........ 709/224; 717/133; 717/136; 719/331; 370/348; 370/229; 711/103

(58) Field of Classification Search .......... 709/217–228; 717/133, 136; 719/331; 711/103; 370/348, 370/229
See application file for complete search history.

(56) References Cited

U.S. PATENT DOCUMENTS

| | | | | |
|---|---|---|---|---|
| 7,529,222 | B2 * | 5/2009 | Kim et al. | 370/348 |
| 7,567,543 | B2 * | 7/2009 | Cao et al. | 370/338 |
| 7,581,142 | B2 * | 8/2009 | Sultan et al. | 714/38 |
| 7,735,075 | B2 * | 6/2010 | Fan et al. | 717/162 |
| 2007/0002734 | A1 * | 1/2007 | Kim et al. | 370/229 |
| 2007/0058664 | A1 * | 3/2007 | Kim et al. | 370/447 |
| 2007/0156951 | A1 * | 7/2007 | Sultan et al. | 711/103 |
| 2008/0098367 | A1 * | 4/2008 | Partridge et al. | 717/136 |
| 2008/0291855 | A1 * | 11/2008 | Bata et al. | 370/311 |

* cited by examiner

*Primary Examiner* — Haresh N Patel
(74) *Attorney, Agent, or Firm* — Jeffrey J. Brosemer; Joseph Kolodka (57) ABSTRACT

A computer implemented technique framework, prototype tool and associated methods that provide a high degree of visibility and control over the in-field execution of software in a minimally intrusive manner wherein developer-defined correctness tests and validation logic are embedded into the sensor node itself, making in-field software testing autonomous without necessitating continuous developer participation.

8 Claims, 9 Drawing Sheets

```
/* Interposition module for Surge */
modheader_t modheader = {
    .mod_id = SURGE_INTER_PID, /* module id */
    .num_prov_func = 1, /* provided functions */
    .funct = {
        [0] = {inter_get_hdr_size, "Cvv0", SURGE_INTER_PID,
            GET_HDR_SIZE_FID}
    }
};
/* interposed get_hdr_size implementation */
uint8_t inter_get_hdr_size(func_cb_ptr p) {
    return 0;
}
```

FIG. 3A

```
/* Surge module (interposed) */
...
/* call to get_hdr_size in TreeRouting */
size = SOS_CALL(s->get_hdr_size, get_hdr_size_proto);

/* TreeRouting module */
...
/* native get_hdr_size implementation */
uint8_t tr_get_hdr_size(func_cb_ptr p) {
    return sizeof(tr_hdr_t);
}
```

VISIBILITY AND CONTROL OF WIRELESS SENSOR NETWORKS

CROSS REFERENCE TO RELATED APPLICATION

This application claims the benefit of U.S. Provisional Application No. 60/912,489 filed 18 Apr. 2007 the entire file wrapper contents of which are incorporated herein as if set forth at length.

FIELD OF THE INVENTION

This invention relates generally to the field of wireless sensor networks in particular to a software architecture and associated methods that provide fine-grained visibility and control of sensor node software in a minimally-intrusive manner.

BACKGROUND OF THE INVENTION

As wireless sensor systems and networks thereof transition from research prototypes to commercial deployment their reliable and dependable operation is crucial to widespread adoption and commercial success. Unreliable sensor network operation is oftentimes the result of one or more of the following events: (a) hardware faults (e.g., failure of hardware components such as sensors), (b) software problems (e.g., bugs, incorrect program logic, unsafe operations), or (c) networking issues (e.g., interference, collisions).

Those skilled in the art will readily appreciate that ensuring reliable software operation in wireless sensor networks offers an extremely challenging set of problems. In particular, a combination of severe resource constraints, lack of architectural safety features such as memory protection, and operation in unpredictable environments leads to uncommon and unexpected failures in sensor networks that oftentimes manifest themselves only at run-time through complex trigger mechanisms. As a result, pre-deployment testing using conventional quality assurance tools such as simulators is not sufficient as it does not accurately reflect the sensor system's post-deployment behavior. Consequently—for contemporary sensor systems—in-field testing and validation of deployed systems is necessary.

For post-deployment testing, the more "visibility" a software designer can obtain into program behavior as it executes in-field, the easier the program will be to test, analyze, validate, and if needed, debug. Furthermore, visibility is essential for exercising control (e.g., to correct/mask errors, access control, resource allocation) over software execution in deployed sensor nodes. Unfortunately, obtaining fine-grained visibility into a running software system is hard in any embedded system and even harder in sensor networks where the nodes under test may be several wireless hops away.

SUMMARY OF THE INVENTION

The above problems are solved and an advance is made in the art according to the principles of the present invention directed to a computer-implemented framework, prototype tool and associated methods that provide a high degree of visibility and control over the in-field execution of software in a minimally intrusive manner.

According to an aspect of the present invention, developer-defined correctness tests and validation logic are embedded into the sensor node itself, making in-field software testing autonomous without continuous developer participation. Importantly, developers are able to push corrective actions onto the node under test, which automatically get invoked when anomalous software behavior occurs.

In sharp contrast to prior-art approaches to sensor node software which employ interactive debugging methodologies that ferry debugging information between a node under test and a developer and require continuous developer participation during testing, the present invention embeds developer-defined correctness tests and validation logic into the sensor node itself, making in-field software testing autonomous.

Advantageously, the present invention present invention does not involve the debugging of individual lines of source code, rather it operates at a higher level of abstraction to provide run-time visibility and control over the interactions of larger units of functionality (e.g., tasks, modules, threads). Consequently, it permits high-level functionality testing while answering questions that are meaningful in the context of the application (e.g., whether the sensor driver returns sensed data when requested and what the observed range of the sampled values is).

Of particular advantage, and according to yet another aspect of the present invention, visibility and control are provided in a non-intrusive manner. No change is required to the source code of the software being tested and debugged. In fact, the target software as well as other software components that it interacts with are oblivious to the testing and continue to operate normally.

Operationally, the present invention achieves these advantages by interposing the target software's data-flow interactions (such as messages) and control-flow interactions (such as inter-process communication calls, system calls, and calls to event handlers) with the rest of the system. As a result, sensor network designers can not only analyze and verify the behavior of remotely deployed nodes, but also easily detect (and often even prevent) incorrect and unreliable operation.

BRIEF DESCRIPTION OF THE DRAWING

A more complete understanding of the present invention may be realized by reference to the accompanying drawing in which:

FIG. 2 is a schematic block diagram depicting interposition according to the present inventions for FIG. 2(A) interaction of module A in SOS.

FIG. 3 shows code segments for FIG. 3(A) interposing a cross-module function call from Surge to Tree; and FIG. 3(B) for Surge and Tree Routing showing the call site and native function cal implementation.

FIG. 5 is a pair of graphs showing delivery latency of SURGE packets FIG. 5(A) from a base station; and FIG. 5(B) a node 4 hops away.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, the diagrams herein represent conceptual views of illustrative structures embodying the principles of the invention. We initially present an overview of the present invention and its design principles. At this point, we intentionally keep the description generic to the extent possible.

Overview

For purposes of illustration, consider a software system running on a sensor node to be comprised of one or more software modules, i.e., segments of code componentized by functionality. As can be readily understood by those skilled in the art, a number of sensor operating systems have embraced such modularity in their run-time software architecture (e.g., modules, processes, and threads).

By definition, software modules that are part of a larger software system use a set of well-defined interfaces to interact with the rest of the system. These interfaces, which represent a boundary of a software module with its environment, present—according to the present invention—a natural opportunity for our inventive interposition approach.

Figure 1:
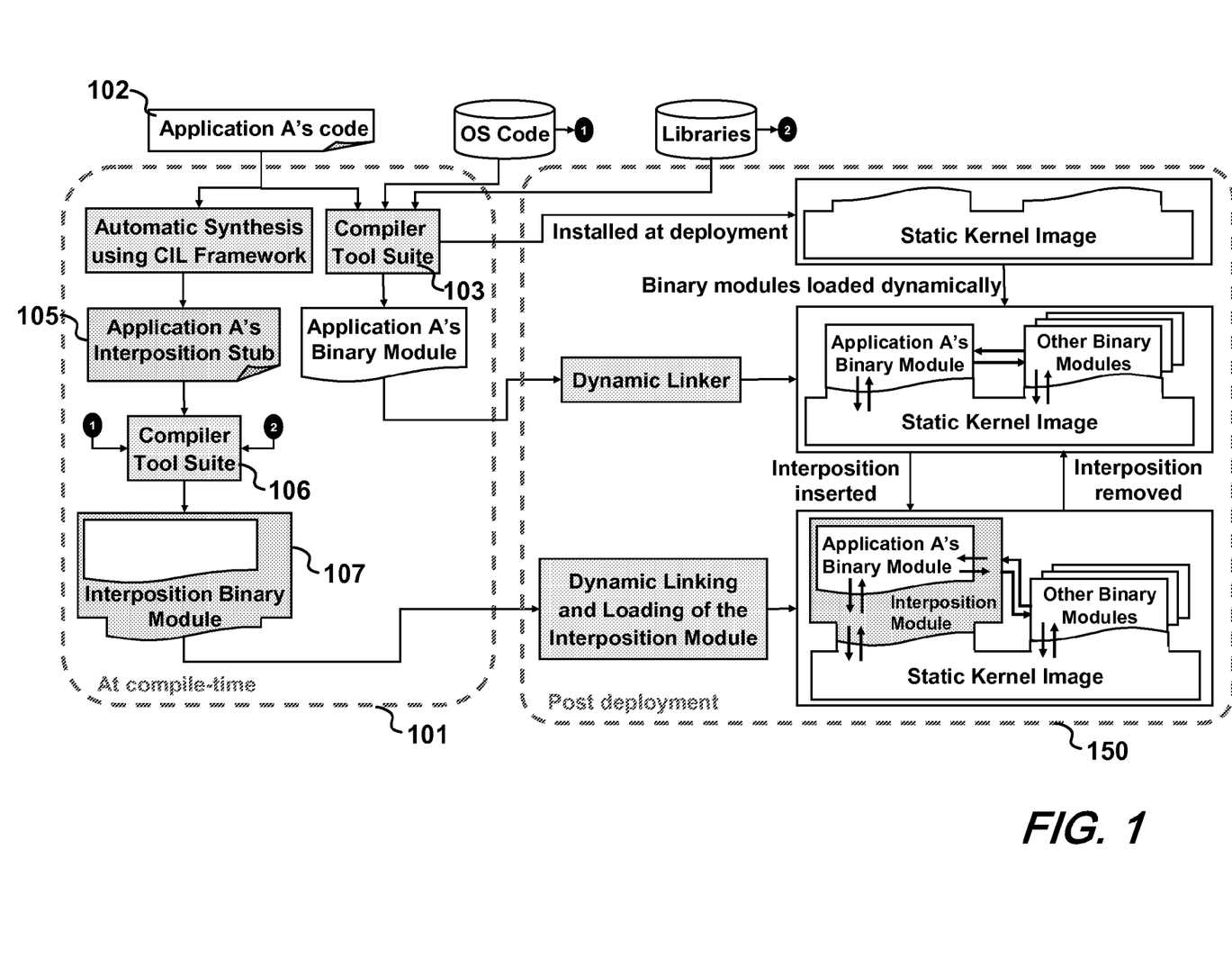
FIG. 1 is a schematic block diagram showing the overall interposition architecture and associated components of the present invention.

With initial reference to FIG. 1, there is shown a schematic diagram depicting the principles of module interposition according to the present invention. For our purposes and as used herein, we have named our inventive system "HERMES". As preferably implemented, software modules link and interact directly with one or more runtime libraries during normal execution. An underlying principle—according to the present invention—is that an additional software component (referred to as the interposition module) is interposed between a module (referred to as the target module) and the sensor runtime. Advantageously, the interposition module can then observe and control the interactions to and from the target module.

With continued reference to that FIG. 1, there it may be seen that interposing a target module is a two-step process. The first step, shown in the dashed box 101, is performed off-line and involves the generation of a customized interposition stub 105 based on the interfaces used and provided by the target module. Accordingly, a target module's source code 102 is parsed via compiler tool suite 103 which determines any specific interfaces that the target module uses to interact with any runtime modules, and automatically synthesizes a template interposition stub 105 customized for that target module 102.

We refer to it as a template interposition stub 105 since its functionality may be extended to support advanced interposition tasks. The stub 105 is packaged by compiler tool suite 106 into an interposition binary module 107 that is now ready for interposing the target.

The second step in our inventive interposition process, shown in FIG. 1 by the dashed box 150 on the right, involves the insertion of the interposition module into the original running system, to interpose the interfaces between the target module and the runtime.

As may now be appreciated by those skilled in the art, for sensor operating systems, the interfaces that need to be interposed can be categorized as (i) functions provided by the target module, (ii) handlers for events and messages received from other modules and the runtime, and (iii) functions provided by the sensor runtime and other modules that are invoked or otherwise used by the running target module.

Upon insertion, the interposition module provides to the runtime, a handler or function corresponding to each handler or function provided by the target module. Similarly, for every function invoked by the target module into the runtime or another module, the interposition module presents a corresponding interface to the target module. The interposition module thus mimics the runtime from the target module's perspective and the target module from the runtime's perspective.

Design Principles

According to an aspect of the present invention, we provide a powerful, flexible, and lightweight mechanism to observe and control the in-field behavior of sensor software. To implement such mechanism(s), a number of design principles were developed.

Dynamic extensibility: The true potential of a framework to observe and control post-deployment behavior can be realized only if it allows users to easily introduce, change, and remove interposition functionality in an incremental manner as needed. Unforeseen failures and other scenarios encountered in sensor deployments demand such dynamic extensions. As can be appreciated, requiring interposition functionality to be completely incorporated or otherwise embedded into the sensor software prior to deployment, would either restrict the type of changes possible to the interposition functionality or require the node's entire binary image to be recompiled and redistributed for each change.

Advantageously, and as previously noted, there are several sensor runtimes that support dynamic software extensibility. Additionally, even runtimes with monolithic binaries are often amenable to dynamic extensibility with some effort. For example, add-ons or application-specific virtual machines may provide techniques sufficient to achieve dynamic extensibility. In prototype implementations—our inventive HERMES was carried out on the SOS operating system that supports dynamic extensibility.

Flexibility in interposition granularity: Since the level at which software behavior is observed may determine both the degree of understanding and the type of control that can be exercised over the behavior, it is necessary to allow for several vantage points to suit varied requirements. For example, a developer interested in tapping outgoing packets from a node would prefer to just tap into a node's radio interface rather than the messaging interface of each module.

In the design of HERMES, the module interface was chosen as it advantageously allowed such latitude. HERMES can interpose a subset of the module's interfaces (one function at its minimum), several modules at once, the communication interface (network driver module) out of a sensor node, or even several nodes at once, thus providing several choices in granularity. Further, in operating systems such as SOS, Contiki, and MANTIS, modules can represent applications, middleware, or even extensible kernel components (e.g., sensor drivers), making HERMES even more powerful.

Non-intrusiveness: Non-intrusiveness refers to the extent to which the original behavior of the system is affected due to providing visibility and control. While interposition naturally carries overhead, it must not significantly alter the execution of the software. Further, developers should have the ability to turn up or turn down the extent of interposition based on the permissible overhead.

HERMES supports selective interposition both temporally, i.e. can be turned on and off dynamically, and spatially, i.e., can be applied to a subset of interfaces. Second, unlike over-the-network debuggers such as Marionette, HERMES does not interrupt execution to gather information, providing visibility and control while the software continues to execute normally. Third, HERMES does not require any modification to the source code of the module being interposed. In fact, the target module is completely oblivious to the interposition itself.

Ease of use: Finally, HERMES makes it easy for developers to write the code that enables visibility and control by automatically synthesizing code stubs that handle the mechanical details of the interposition. Developers only need to fill these stubs with the logic needed to operate on the interposed observations. In other words, we provide ready-made hooks for visibility and control of the target module, but give the developer complete freedom to use these hooks as desired. For example, a designer may choose to just log a target module's interactions with the rest of the system, or choose to trap, modify, or even suppress them.

Usage Scenarios for Hermes

The HERMES interposition framework can be used to implement a variety of observe and control functions desired for deployed sensor networks. Below, we briefly describe some envisioned uses of HERMES. In Section 2, we detail three specific case studies implemented using HERMES.

Observing In-Field Execution

In its most basic form, the HERMES framework can be used to enable a high degree of visibility into software execution on remote sensor nodes. In addition to the ability to record and timestamp inter-module interactions, the interposition code also has limited visibility into the state of the module being interposed, i.e., as allowed by the state-access hooks available within the runtime. Traces of the functions of a module that were invoked, when they were invoked, the parameters passed with these calls, and how the module's internal state changed as a result of these calls are obtainable using HERMES. Further, HERMES also enables the following more advanced forms of visibility:

Conditional Watchpoints Based on In-Field events: Since developers can explicitly specify which interactions to interpose, when to interpose, and what to do with the interposed interaction, debugging tasks can be dynamically triggered in response to specific in-field events. For example, receiving a packet from a new neighbor node or a message with a certain payload can be used to trigger a detailed execution trace. Such conditional visibility is attractive from an overhead point of view, and is a useful contrast over interactive, over-the-network debuggers.

Synthetic event generation and in-field testing: Since HERMES allows observing and controlling a module's interactions, one can present an alternate behavior of the module to its surroundings—a useful feature for applications. For example, in a network deployed for wildfire monitoring, interposition modules inserted at specific nodes in the network can synthesize sensor traces to mimic fire events. The subsequent response of the network can help verify the readiness of the deployment—similar to real-world fire drills.

Controlling In-Field Execution A broad set of network management and maintenance operations can be easily implemented through HERMES. Below, we outline uses that emphasize HERMES's ability to control the interactions of a target module.

Dynamic access control policies: Since the functionality of a deployment can be compromised or disrupted due to faulty or malicious nodes, it is necessary to have the ability to quarantine specific nodes and limit the disruption. Clearly, such measures need to be both dynamic and ad hoc to handle security emergencies unforeseen at the time of deployment. HERMES can be used to interpose and hence tap into the network stack, to dynamically add appropriate firewall rules at the nodes neighboring the rogue nodes.

Traffic shaping to manage shared network resources: Resources such as the limited wireless bandwidth must be carefully allocated to suitably address metrics such as fairness and network longevity. Several factors must be considered and these factors could vary drastically over time, driving a need for dynamic adoption of allocation policies. By interposing the communication path, HERMES can be used to dynamically (and with little overhead and disruption) introduce resource allocation policies to adapt to changing network conditions.

Fixing isolated in-field failures: Sensor network deployments will continue to be marred by failures due to hostile environments, unreliable hardware, and buggy software. HERMES can be used to architect both preventive mechanisms (e.g., forcing a fail-safe operation upon seeing an illegal interaction) and, at the other end of the spectrum, recovery mechanisms (e.g., stateful rollback using interaction traces). However, we expect to see HERMES being particularly useful for emergency recovery measures under isolated failures, especially in critical deployments. Certain hardware failures of a sensor node can be detected and masked to keep the sensor node as a whole operational, until a more comprehensive corrective action can be taken. For example, upon detecting a bad reading from a temperature sensor (say the sensor becomes stuck at zero—a common), a stub interposing the sensor driver could substitute the reading with an acceptable one estimated either from prior readings or from those of its neighbor, as well as report the error to the network operator. Of course, the temperature example is just that—one example. Other sensor(s) responses such as pressure, etc may advantageously employ the same methodologies as this exemplary temperature.

Implementation

Implementing HERMES for any sensor runtime poses a number of challenges. First, we require the interposition to be transparent to the module being interposed, as well as to other modules in the system. This implies that no changes should be made to the source code of the target module or other modules while also providing transparency at runtime. Second, to allow flexible use of interposition capability one should dynamically configure interposition not only for any module in the system, but also for a subset of interfaces of each module. This configuration needs to be atomic with respect to the modules in the system. Finally, the HERMES implementation should have a low memory and computational footprint, so that it does not affect the performance of the system. Our prototype implementation of HERMES for the SOS operating system, described below, addresses these specific challenges.

SOS—A Modular Sensor Network OS

SOS is a sensor operating system with a structured architecture based on a small kernel that is installed on all the nodes in the network. The rest of the system and the application functionality are implemented as a set of dynamically loadable binary modules. This modularity forms the basis of the SOS architecture, as it defines distinct boundaries and allows modules to be loaded and unloaded at runtime.

Figure 2A:
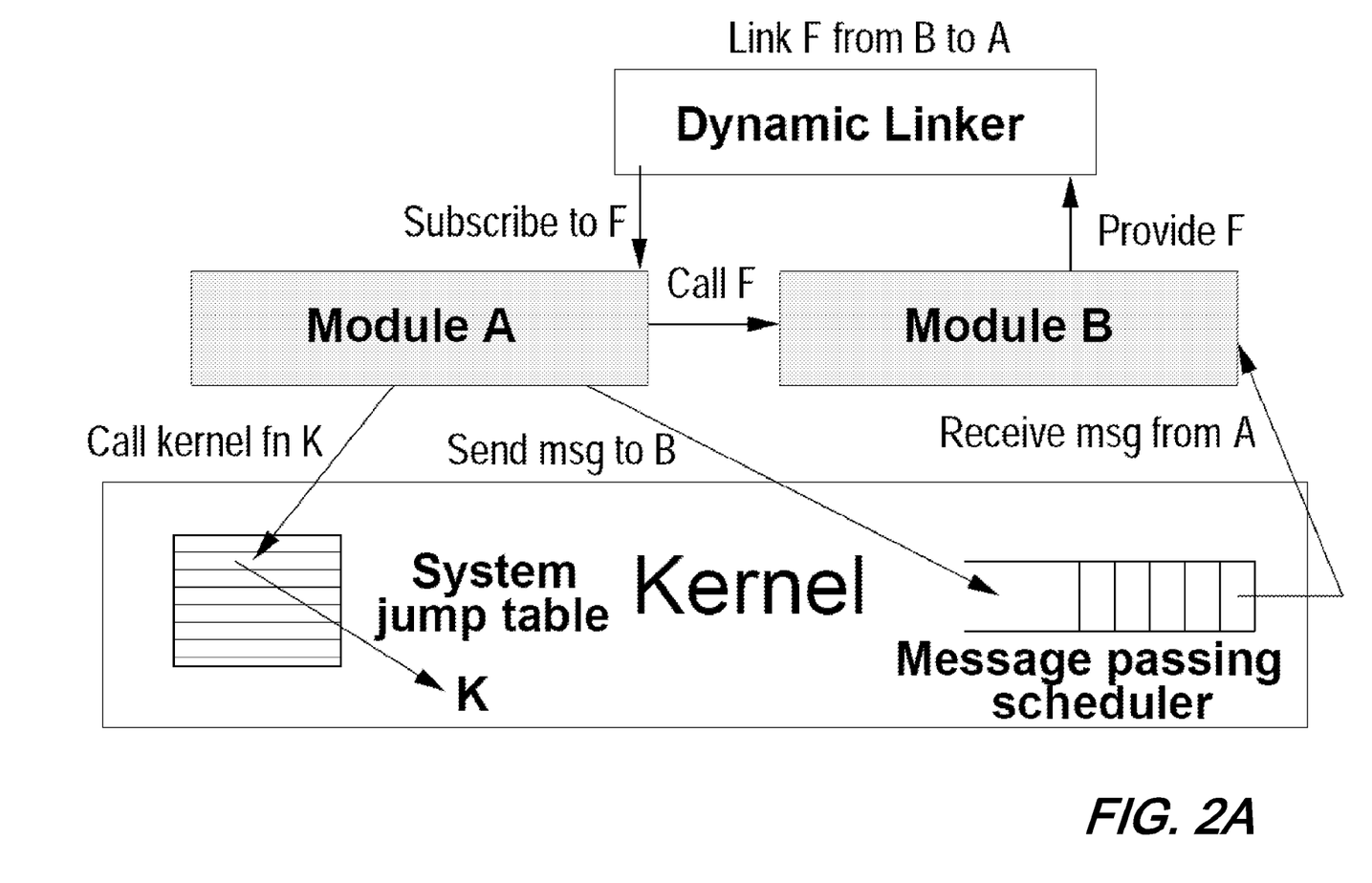

SOS provides an event-driven execution model, with each module implementing a handler that is invoked by the OS scheduler to dispatch messages to destination modules. Modules interact with one another and with the kernel through both synchronous function calls and asynchronous messages. FIG. 2(A) shows the basic architecture of SOS and the well-defined communication paths for modules to interact with each other and with the kernel. These paths provide definite points for the SOS kernel to track execution context, e.g., when messages cross module boundaries.

Synchronous communication between modules is implemented by SOS using dynamic linking. A module's binary encodes the set of functions it provides and those it subscribes to. At load time, the dynamic linker tracks down and links all the provide-subscribe function pairs. Modules can also send asynchronous messages to each other by posting them to a queue managed by the scheduler, which invokes the message handler of the destination module. The module-kernel interaction takes place via API system calls (to kernel) and asynchronous messages (from kernel).

Hermes Implementation Overview

Figure 2B:
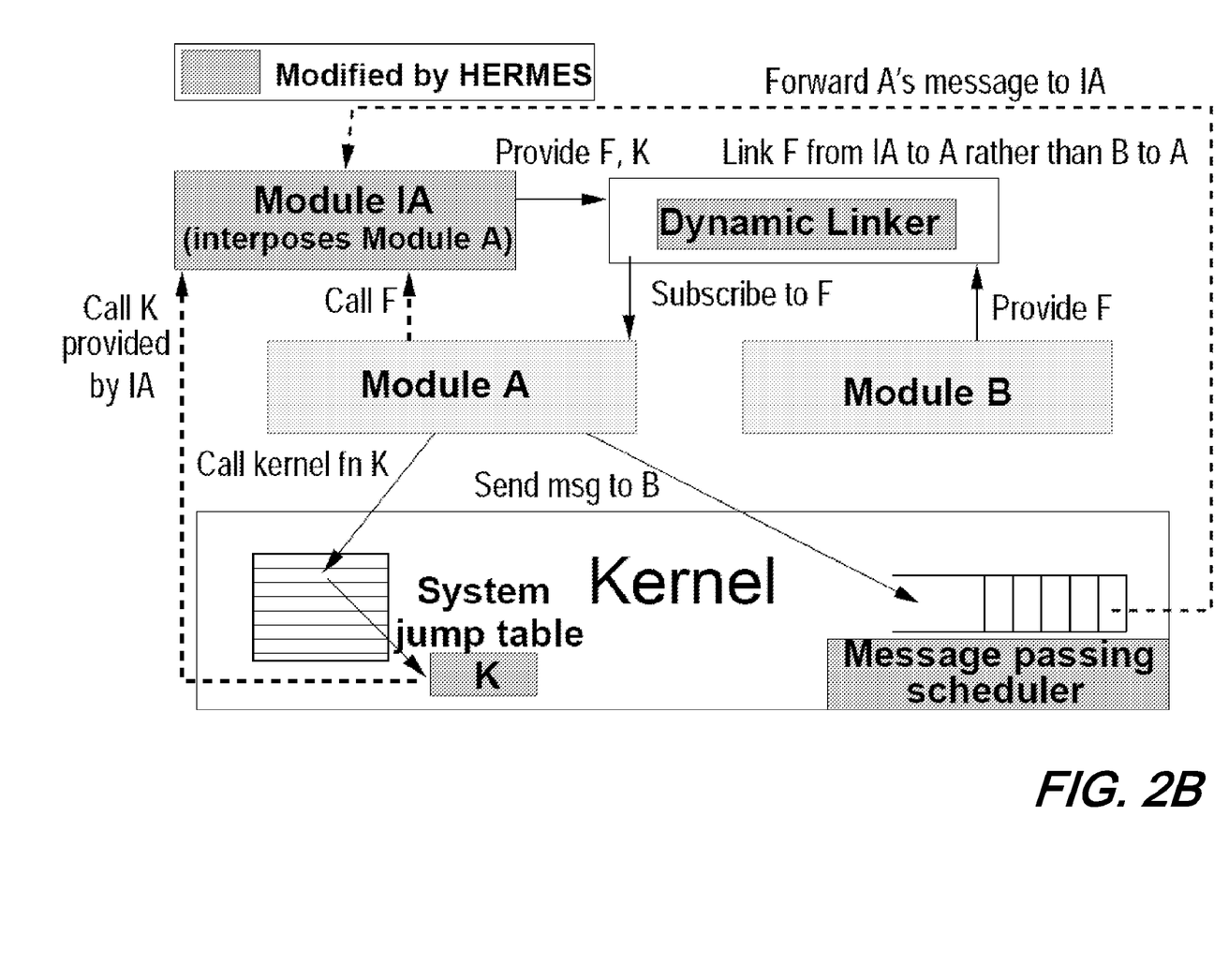
FIG. 2(B) interposition of module A by module IA in SOS with interposition enabled.

Our HERMES prototype exploits the clean module-to-module and module-to-kernel communication paths in SOS to provide the network designer with the capability of trapping all interactions of a user module with the rest of the system (function calls and messages both directed to and from a target module) at the module boundaries. As may be observed in FIG. 2(B), HERMES redirects trapped interactions to an interposition module specific to the target module.

Advantageously, and according to the present invention, a target module can have its own dedicated interposition module, or a single interposition module may serve multiple target modules. Consequently, HERMES increases the number of modules present in the system only marginally.

Interposition is completely transparent as: (i) no changes are required to a target module's source code to enable interposition, and (ii) no other module the target interacts with is aware of the interposition. In addition, interposition is also dynamic and selective, i.e., it can be turned on or off at runtime, and a programmer can choose which interactions of the target to interpose. In summary, HERMES provides flexible interposition at the granularity of individual function calls and messages, with minimal footprint on the system.

HERMES achieves transparent interposition by adding lightweight support for interaction redirection in the SOS kernel and by leveraging the dynamic linking mechanism used in SOS. For dynamic interposition control, HERMES provides a new SOS kernel function that can be used to switch interposition on or off for a given target module. HERMES ensures that transitions of the target module between the interposed and non-interposed states are atomic.

To simplify a programmer's task in using HERMES, we have developed tools that automatically generate a skeleton of the interposition module from the code of a target module. The actual functionality of the interposition module is provided by the developer, thus granting him/her the flexibility of choosing what to do with the interposed interactions.

Runtime Interposition System

HERMES interposes three types of interactions of a module with the rest of the system: (i) kernel API calls (with the kernel); (ii) subscribed/provided user function calls (with other modules); (iii) messages (with kernel, other modules, and network). We now describe the mechanisms used in our modified SOS kernel to redirect these interactions, as well as to enable dynamic interposition control.

Kernel Call Redirection

To intercept and redirect all kernel API calls made by the interposed module to functions provided by the interposition module, we augment all kernel functions with a prologue consisting of a few lines of redirection code. The redirection code checks if the calling module is interposed and if its interposition module provides an alternate function to substitute for the kernel call. If so, it calls the alternate function provided by the interposition module, otherwise it falls through to the default kernel call implementation.

The alternate implementation of a kernel call provided by the interposition module may in turn make kernel calls, including the redirected one, e.g., after logging it, changing its parameters, etc. This could result in loopback redirection (thus infinite recursion). To avoid it, we track the context from which a kernel call is made, and distinguish between calls made from within an interposed module (to be redirected) and calls made after control crosses module's boundaries (to fall through).

Cross-module Call Redirection

The kernel redirects cross-module calls issued by and to an interposed module to their corresponding implementations provided by its interposition module, using the dynamic linking facility provided by SOS. This redirection is performed when either a new module is inserted into the system or when interposition is turned on for an existing module. Non-interposed functions of the target module are linked directly to their real implementations, with no additional call overhead.

The kernel performs the following steps when loading and linking a new module M: (i) if an interposition module for M is already present in the system and interposition is turned on for M, link all of M's subscribed and provided functions to the interposition module; (ii) if M subscribes to functions provided by an already interposed module, link M to the respective interposition module; (iii) if an interposed module subscribed to M's functions, do not link that module to M (since it is already linked to the function provided by its interposition module).

The kernel performs the following steps when interposition is turned on dynamically for a module M: (i) re-link the functions subscribed to by M to the corresponding functions provided by its interposition module; (ii) re-link the subscribers of every function provided by M to the corresponding function provided by M's interposition module.

When interposition is dynamically turned off for M, the kernel simply uses the default linking mechanism of SOS to re-link M into the system. In our implementation, the above steps are guaranteed to be atomic with respect to a target's interactions with other modules since they are either executed in the nonpreemptible message handler of the kernel loader or as a result of a system call made from the nonpreemptible message handler of a user module.

Incoming Message Redirection

The kernel redirects a message sent to an interposed module to the corresponding interposition module by checking if the destination module is interposed, and, if so, diverting the message to the handler within the interposition module. The kernel also transfers memory ownership of the diverted message's payload to the interposition module. Upon receiving the message, the interposition module can use the (unmodified) destination field of the message to discriminate between redirected messages and those actually intended for it.

Outgoing Message Redirection

In SOS, messages are sent by a user module using one of the post_* kernel API calls. Since all kernel functions are redirected to the interposition module of the caller module (if any), all messages originating in an interposed module are automatically redirected to the interposition module.

Dynamic Interposition Control

The kernel provides dynamic interposition control at runtime. A field in the kernel module descriptor stores a pointer to the module's interposition module, if any. This field is used to control the module's interposition status (on/off) and can be set/unset using a kernel API function provided by our modified SOS kernel. The interposition module also stores a duplicate of the interposition status in a reserved field in its module-specific state. This copy acts as a backup in case the target module is removed from the system while interposition is still turned on, or if interposition is turned on before insertion of the target module. Upon loading a module whose interposition module is already present in the system, this field is checked to determine whether or not the new module's interactions need to be redirected. This enables per-module dynamic control of the kernel redirection mechanisms without removing the interposition module from the system or restarting it, even when the target is absent from the system.

Interposition-stub Synthesis As described in the previous section, the HERMES runtime interposition system redirects, to the interposition module, all the cross-module calls to and from its target module, the kernel calls that the target makes, and the messages that the target sends or receives. Consequently, an interposition module's code will have a structure specific to the module it interposes. HERMES provides a preprocessor to automatically generate a customized stub of the interposition module from the source code of its target module. This tool is built over the CIL compiler framework for C.

The preprocessor takes as input the target module to be interposed and generates an interposition module containing stubs for certain types of functions to which the kernel redirects calls to/from the target: (i) functions provided by the interposed module (to which the kernel redirects calls made by other modules), (ii) functions subscribed to by the interposed module (to which the kernel redirects calls made by the interposed module), and (iii) kernel API functions used by the interposed module (to which the kernel redirects kernel calls made by the interposed module).

To further ease the programmer's burden, the preprocessor builds in default "null" functionality into the generated interposition module, such that directly running it causes interposed interactions to be simply redirected to their original intended target. With this default functionality in place, the programmer need only modify code to handle the specific interactions to be interposed.

Figure 3A:
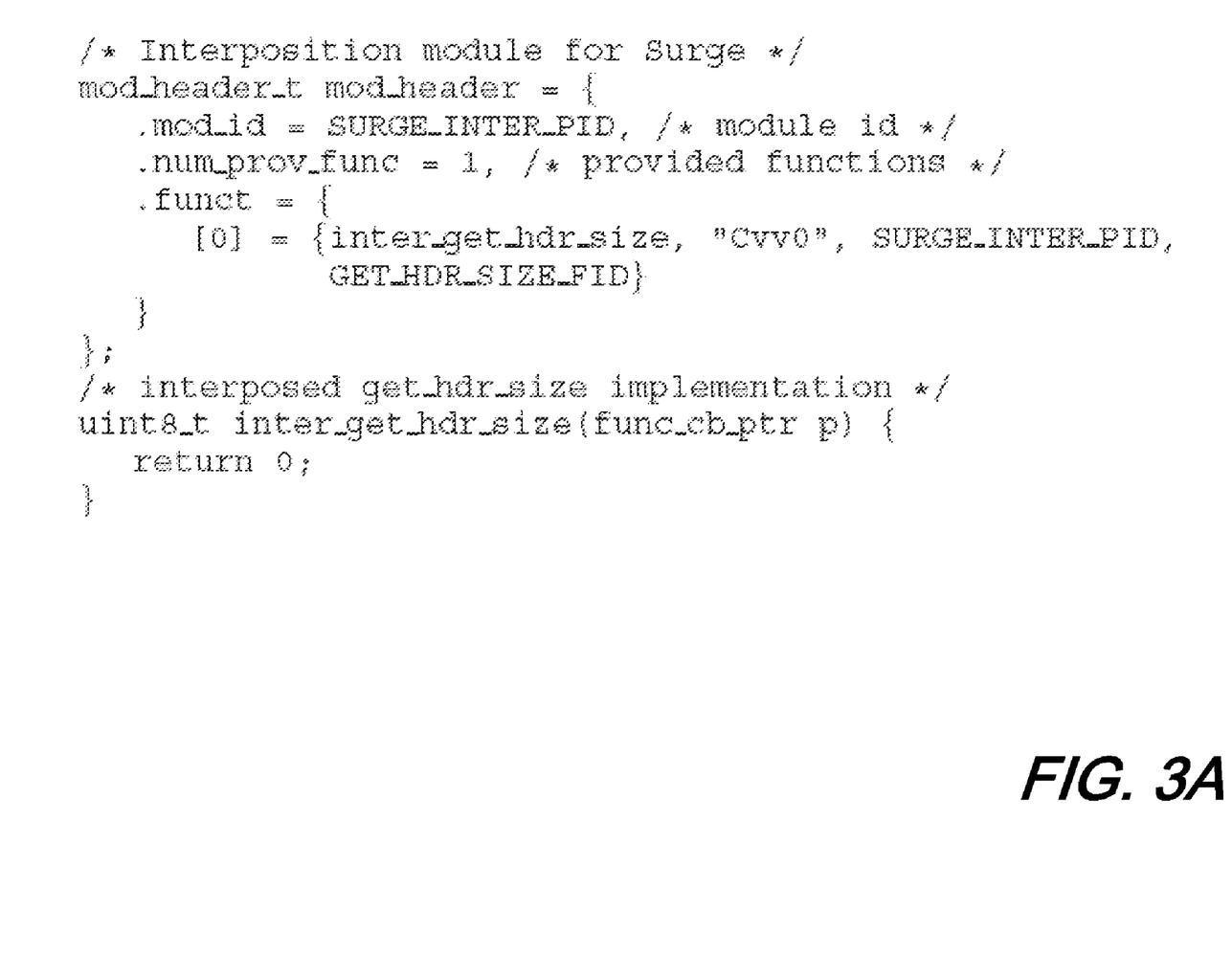
Figure 3B:
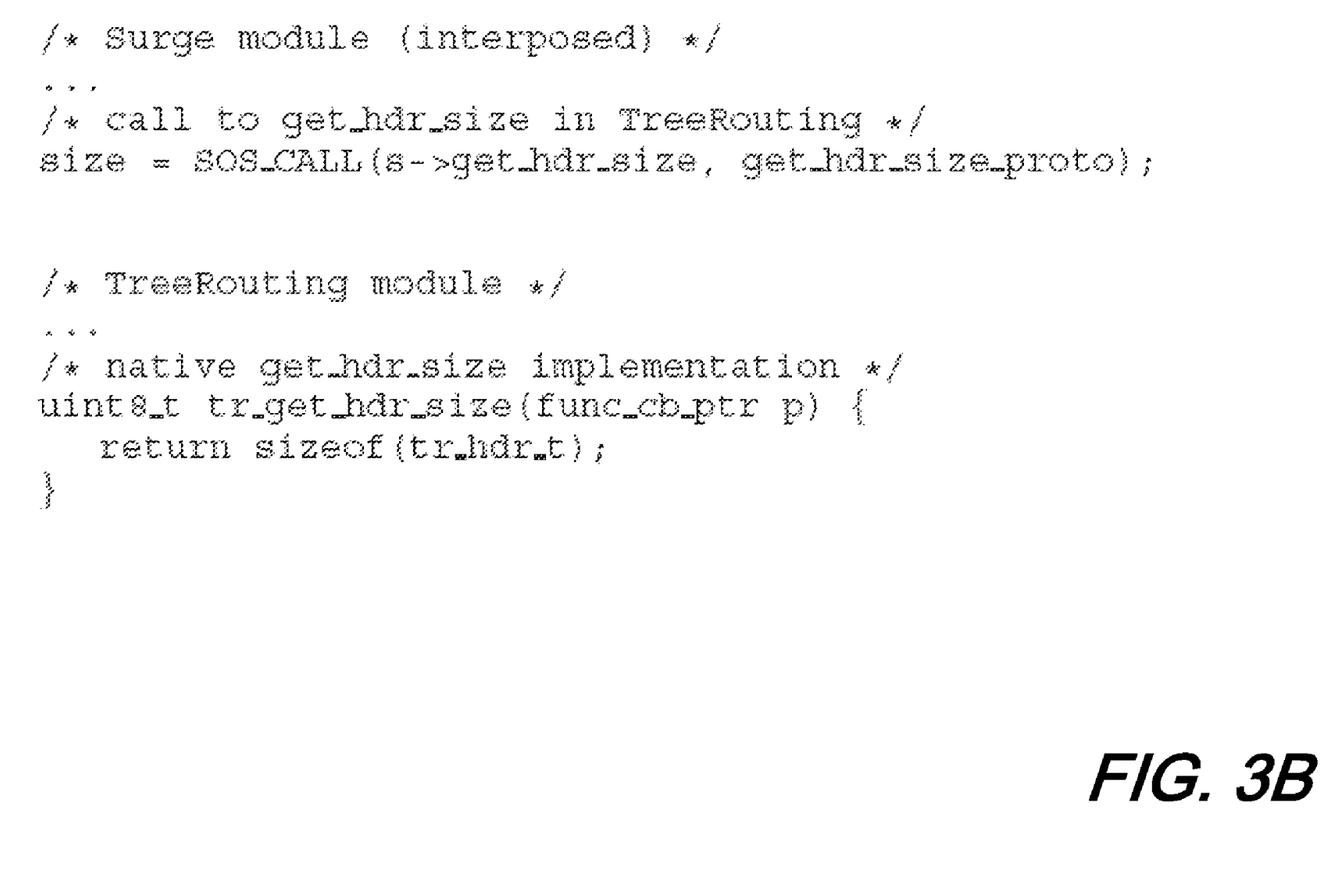

FIG. 3 shows an example of coding cross-module call interposition for the Surge application module. The interposition module (FIG. 3A) implements the inter_get_hdr_size function, whose stub had been generated by our preprocessor since the Surge module calls the tr_get_hdr_size function provided by the TreeRouting module (FIG. 3B). The programmer has filled in code in the stub to return a header size of zero. If the programmer chooses not to interpose this function, it's entry can simply be removed from the list of provided functions in the module's header shown at the top. Note that HERMES imposes no restriction on how the original application (FIG. 3B) itself is written.

Discussion

We described in this section our implementation of HERMES for SOS. The architecture of HERMES is, however, general and can be implemented over a variety of other operating systems. For multi-threaded operating systems such as Contiki and MANTIS—which have dynamic linking capabilities—our technique for modifying the dynamic linking mechanism may be extended thereby allowing for the interposition of individual threads. Our inventive technique could also be applied to other systems such as TinyOS, using capabilities such as FlexCup, which enables dynamic linking for TinyOS. For plain TinyOS, which does not provide for dynamic linking, interposition can either be applied at compile-time, or at runtime using binary rewriting in an approach similar to the one taken by Clairvoyant.

Evaluation

We performed an evaluation of our implementation of HERMES for SOS running Surge, a sensor data collection application. A distributed tree routing protocol (implemented by the TreeRouting module running on every node) builds a routing tree rooted at the base station, which is used by the Surge module at each node to send collected data towards the base station. We micro-benchmark the overhead introduced by HERMES using Avrora, a cycle-accurate simulator for the Atmel AVR instruction set architecture. We also present performance statistics of HERMES on the MicaZ sensor platform.

In the evaluation, we simulated Surge in Avrora, running it on two systems: over the plain SOS, and over SOS with our HERMES implementation (SOS+HERMES). In the SOS+HERMES case, we introduced an interposition module for Surge and ran the simulation twice, once with interposition for Surge turned off, and then with interposition turned on. We used the "null-interposition" module generated by the HERMES preprocessor that simply redirects all function calls and messages to their original destinations, without performing any computation or buffering them. We ran simulations for 500 seconds using three nodes located within one hop of each other and collected statistics using the profiling facilities in Avrora.

We first evaluate the absolute overheads introduced by HERMES in cross-module and kernel call redirection. Table 1 presents call latencies for three functions, for each of SOS and SOS+HERMES, in the two cases of interposition off and on for Surge. The first two functions are representative of typical module interactions via kernel and inter-module calls. ker_id is a kernel function that returns a module's ID. tr_get_hdr_size is a function provided by TreeRouting that is subscribed to and called by Surge upon sending a packet. The third function, inter_get_ker_func, is a lookup function added by HERMES to the SOS kernel and called from all kernel functions. If the module where the kernel call originated is interposed, it returns a pointer to the alternate implementation of the kernel function provided by the interposition module.

As shown in Table 1, for cross-module tr_get_hdr_size calls, the latency increases to 112 cycles with interposition on, due to a lookup of the interposition module's header that the module itself must perform in order to find the target function. inter_get_ker_func takes 23 cycles with interposition off. With interposition on, it takes a variable number of cycles depending on the call site (listed in parenthesis in Table 1), with a maximum of about 350 cycles when called from within Surge.

The module ker_id takes 40 cycles in SOS+HERMES even when interposition is off, due to interposition checks introduced by HERMES—a baseline overhead. When interposition is on, it takes 467 cycles. This steep hike is due to a call to our suboptimal implementation of the inter_get_ker_func lookup function, the rest being due to ker_id needing to be redirected twice, once from the kernel to the interposition module, and then from the interposition module to the kernel. Although these numbers may seem high when compared to the plain SOS, we next show that their effect on the overall system performance of Surge is negligible.

In our next evaluation, we repeated the previous runs on a real sensor testbed of ten MicaZ motes, out of which one was the base station and the others were simple Surge nodes, up to two hops away from it. The execution runs took about 1,000 seconds. We used the Rate Adaptive Time Synchronization (RATS) protocol to time-synchronize the nodes and collected statistics on packet latency and number of packets delivered to the base station.

Table 2 presents memory usage and performance statistics for Surge on plain SOS, and on SOS+HERMES in four cases: no interposition module, Surge interposition module loaded with interposition off and on, respectively, and both Surge and TreeRouting interposed. The last four columns show the performance metrics, demonstrating that interposing Surge and TreeRouting does not impact their operation, as the number of packets delivered remains practically the same for all the scenarios (small fluctuations are due to packet losses caused by wireless link quality). Moreover, the increase in packet latency for a non-base station node in the SOS+HERMES case, expected due to the overhead introduced by HERMES, is only about 3% in the worst case (both modules interposed). For the base station, the relative increase is higher because of the much smaller delivery latency in the base case. We also measured that it takes 2,223 cycles to turn interposition on, which is negligible as compared to around 22 ms taken to load a new module into the system in SOS. We hence conclude that interposition does not significantly impact the performance of the Surge application.

In terms of memory usage, both SOS and SOS+HERMES have the same static RAM footprint, while HERMES causes only a marginal increase in dynamically allocated memory (heap). Note that more than one module can be interposed with no increase in memory footprint. The stack size exhibits a small increase with interposition on, due to extra calls redirected through the interposition module. HERMES adds about 8 KB to the SOS code size (ROM usage). The interposition module that we used further increases the code size by about 1 KB.

Case Studies
Debugging and Verification

We have described the utility of HERMES as a tool for debugging and monitoring software functionality post-deployment. This case study explores this aspect of HERMES further by using it to debug and verify the functionality of a specific software component, namely the RATS time-synchronization protocol.

RATS provides pairwise time synchronization between sensor nodes. A client node that wishes to synchronize its time with a server node receives periodic time-stamped messages from the server node, which it time-stamps upon reception with its current clock value. The client thus maintains a sequence of tuples comprised of its and the server's time-stamps. When queried to convert a given local time into the server's time, the client uses regression to compute an estimate from these tuples.

We design an interposition module to provide visibility into the functioning of RATS. The interposition module intercepts all incoming time-stamp messages for the RATS module at the client. When a time-stamp message arrives from the server, the interposition module extracts the time-stamp values for the server and the client from the message. It then queries the RATS module for an estimated time at the server matching the time-stamp at the client.

It compares the value RATS returns (which is an estimate) with the real server time-stamp to compute the actual error after factoring in transmission delay. The interposition module then copies a snapshot of the state of the RATS module, along with this actual error value, into a packet, and sends it to the base station. It then passes the received time-stamp message through to the RATS module, which continues to function normally.

Even this simple interposition module provides us a lot of visibility into the RATS protocol. We are able to observe exactly when time-stamp messages are received by the client and how its state changes as a result. We are also able to gather insight into the protocol's performance through online computation of the actual error in time synchronization. Note that it is possible to code more sophisticated interposition functionality to get even more insight into the operation of RATS. For instance, one may use the interposition module to model network/node failures or corrupted time-stamps and observe how RATS responds.

Evaluation

We implemented the above described interposition module and evaluated it on two MicaZ motes. We instrumented Surge to use RATS and ran it on both motes for 200 minutes. The base station acted as the RATS server and the other node as the client that tries to synchronize its time with the base station to within a preset error limit of 1 ms. The interposition module at the client sends back snapshots of the state of the RATS module, along with the computed error, in response to the arrival of new time-stamped packets from the base station.

Figure 4:
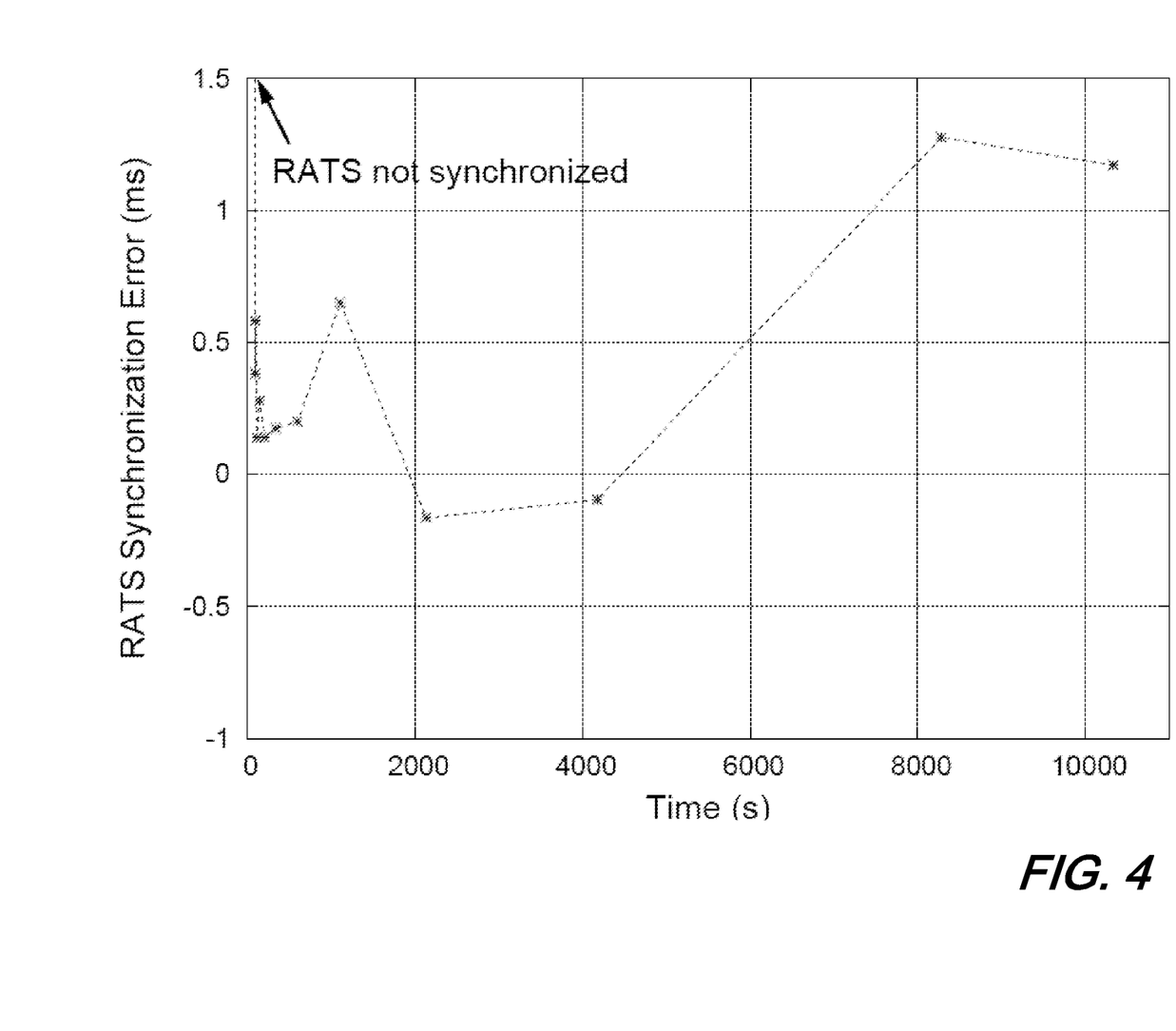
FIG. 4 is a graph showing RATS synchronization error (ms) vs. Experiment time (s)

FIG. 4 plots the actual error calculated by the interposition module versus the time at which the client node received the time-stamped packets. The data verifies the functionality of the RATS protocol in several ways: (i) it validates the way in which RATS adapts its rate of time-stamped packets to the error in time synchronization.

The rate decreases exponentially if the estimated error goes down, and it is increased in response to increases in the error; (ii) it verifies that the estimated error used by RATS to adapt its rate is a good approximation of the actual error: when the actual error calculated independently by the interposition module increased above the acceptable limit of 1 ms set by the Surge module (at 8,000 seconds into the run), RATS doubled its rate of sending time-stamped messages.

Note that, while the interposition module was running, Surge packets were also being sent to the base station. With interposition on, the measured average latency of Surge packets increased from 27 ms to 29 ms, compared with plain SOS, while the number of packets received at the base station remained the same. Thus, the Surge module was negligibly affected due to our testing of RATS and the extra burden on the routing module.

Transparent Software Updates

In a functional sensor network deployment, it may become necessary to update a software module on some or all of the sensor nodes. Dynamic updates might be required in order to fix software bugs, introduce additional features, or tune operational parameters. At the same time, the module being updated may be critical to the functionality of the deployment, requiring the update process to be transparent. Routing is one such critical service. An interruption to update the routing module would not only disrupt communication temporarily, but may also result in sub-par performance upon service resumption due to loss of routing state.

HERMES can be used to eliminate the outage caused by updates to such critical modules. Instead of replacing the old version of the module by the updated copy and taking a service disruption, we may advantageously run the two versions simultaneously for the duration required by the new version to warm-up, i.e., build its service state. During the warm-up phase, we interpose both versions of the module to: (i) hide the presence of the updated copy from the rest of the system; (ii) keep the old version online and continue to use it to answer service requests; and to (iii) fork messages sent to the old version over to the new module to help it build service state. Thus, while the updated copy is building state, the old version of the module is ensuring that the sensor network remains operational. Once the updated copy warms up, the old version of the module and the interposition module are removed and the updated module continues servicing requests without any interruption.

We implemented the transparent update feature for the tree-routing module using our HERMES prototype as a case study. In order to deal with the issue that SOS does not allow multiple modules with the same process ID, we introduce a "back-up" module—identical in functionality to the original tree routing module but with a different process ID, to which the original module's state is copied over to function as it's substitute (via interposition). It should be noted here that no changes were required to the HERMES implementation for SOS to implement the transparent update feature. We only needed to implement appropriate interposition modules to provide transparent update support.

Evaluation

We evaluated the impact of an update to the routing module with the Surge application running on a 5-hop 21-node network in Avrora. We ran Surge on two configurations: (i) plain SOS, and (ii) SOS+HERMES implementing the transparent update support for the routing module.

Figure 5A:
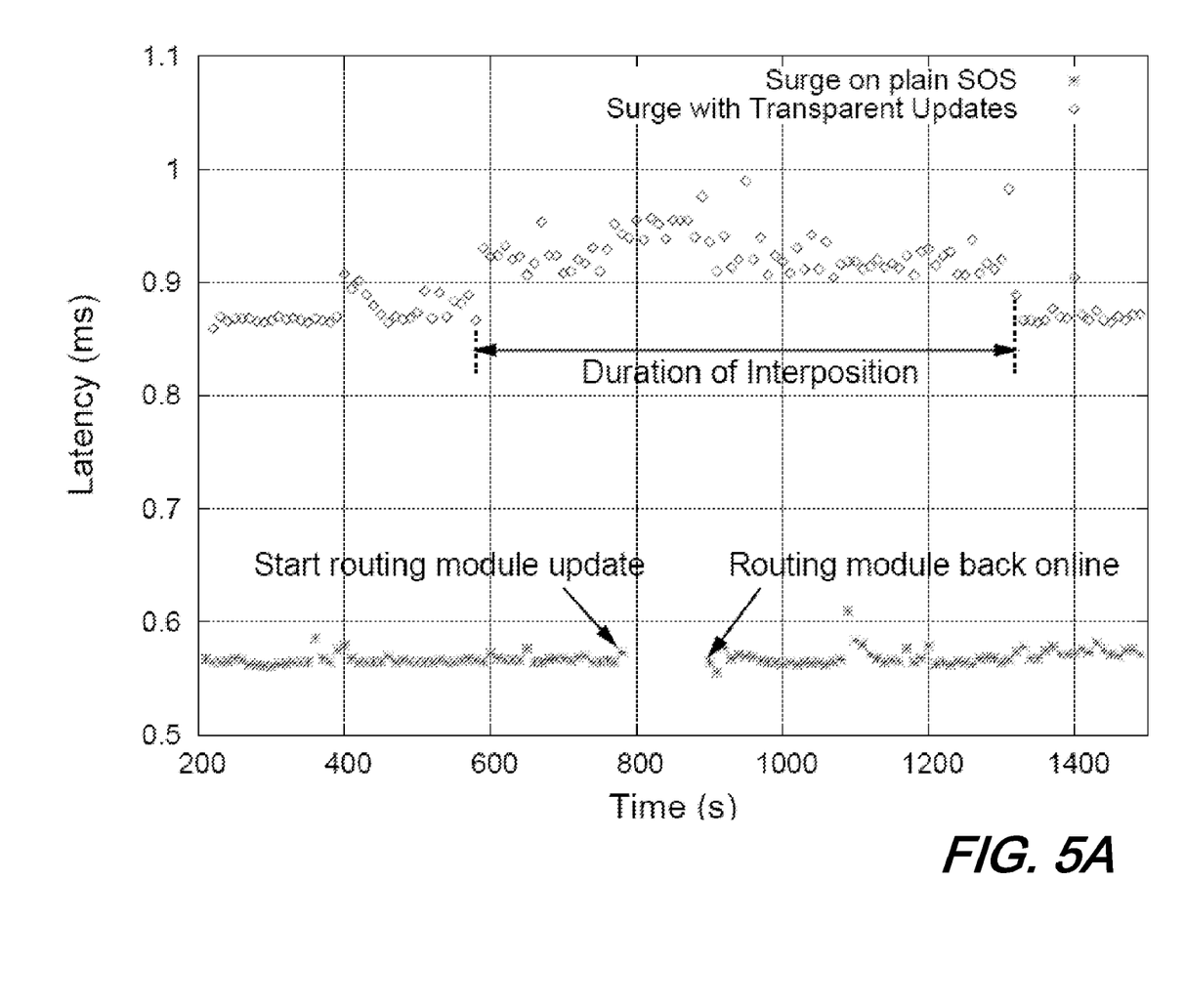
Figure 5B:
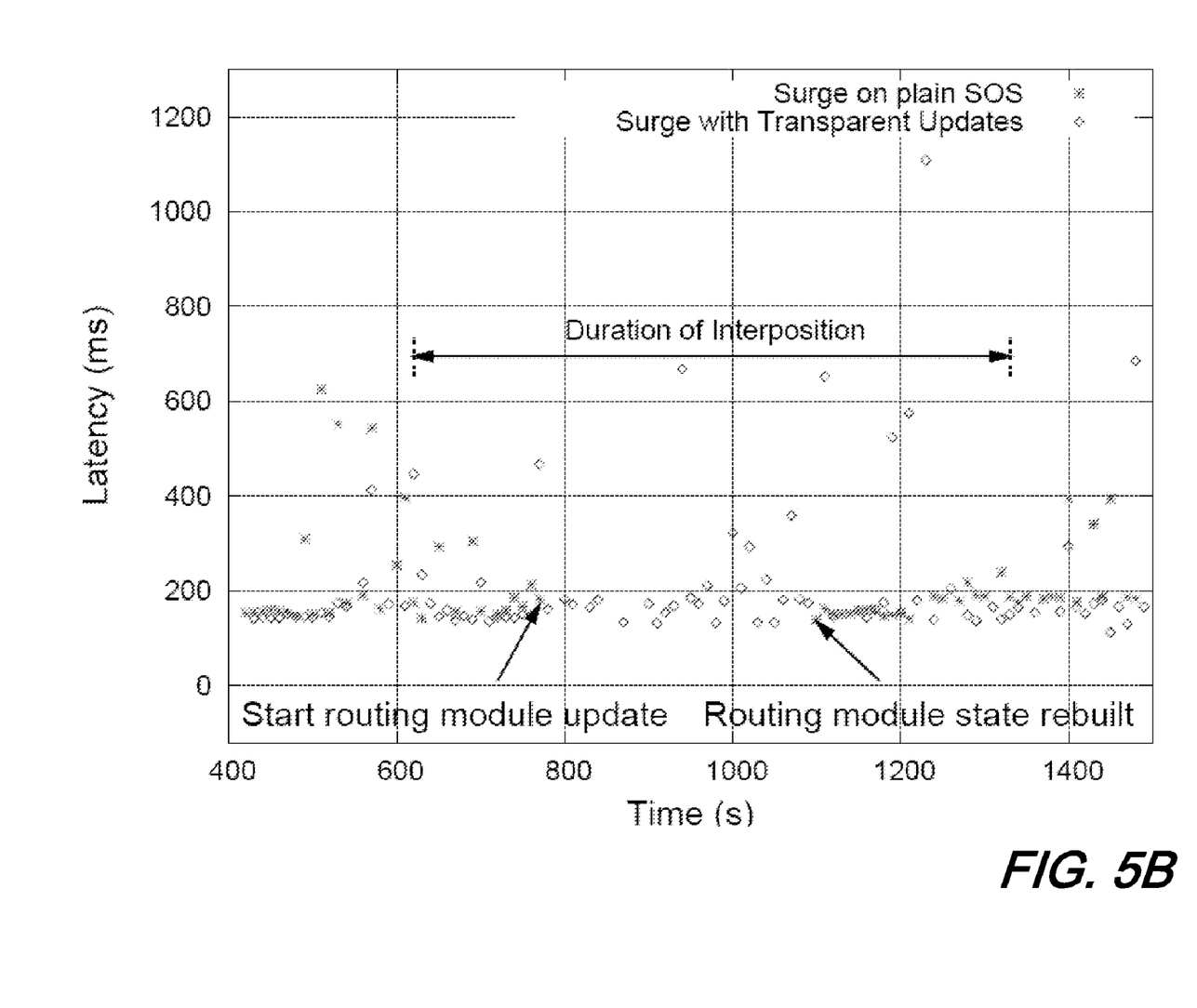

For the plain SOS configuration, the update was emulated by first removing the old module and immediately inserting an updated copy. For the configuration with HERMES and transparent update support, the steps followed the sequence described above with the SOS process ID workaround. Each run was 1,500 seconds long, and included an update to the tree-routing module midway through the run. The results reported are averages across five such runs. From the plots in FIG. 5(A) and FIG. 5(B), which show the average delivery latency for Surge packets from base station and a node 4 hops away respectively, it is clear that when the tree routing module is removed from the system, Surge on plain SOS sees complete disruption in packets delivered. Surge with the transparent update functionality runs with no apparent disruption, but has higher packet delivery latencies consistent with the overhead of interposition.

For this experiment, we also instrumented the SOS kernel and the Surge application to collect per-node statistics for packet drops due to the update. None are reported for the configuration with HERMES and transparent update support, while plain Surge suffers packet losses throughout the network, ranging from 24 at the base-station, to 50 at a node 5 hops away. Losses increase for nodes farther away, consistent with the longer duration taken to rebuild routing state at those nodes.

Traffic Shaping and Rate Control

We have described how HERMES can be used to perform various network management tasks including access control, traffic shaping, etc. In this case study, we design and evaluate an application-specific rate-control scheme using HERMES, to illustrate this capability of our framework. We implement our rate-control scheme by interposing the application's (i.e., Surge's) communication-related I/O calls that are used to send and receive network messages. The interposition module simply enforces a variable, developer-specified upper limit by dropping packets if the current rate exceeds the limit. If the current sending rate is below the limit, the interposition module merely passes the packet through to the network interface, and the corresponding response is returned to the application. Note that while this case study is a simple illustration, HERMES offers the flexibility for users to define more powerful protocol-aware rate-control schemes.

Evaluation

We evaluated the rate-control scheme on a network of nine MicaZ motes set in a 3×3 grid (1.5 feet apart). Besides running Surge and a TreeRouting module on each mote, we also ran a time synchronization protocol (RATS) to measure the latencies seen by packets during the experiments. One of the motes was designated to be a rogue node, and emulated a haywire Surge module that, once triggered, sent data packets at eight times the normal rate. In the base set of experiments, we ran Surge over plain SOS without HERMES. We then ran Surge with our rate-control scheme implemented using HERMES, with the rest of the experimental setup unchanged. Both experiments were run for 2000 seconds, with Surge sending one packet every 8 seconds.

Figure 6:
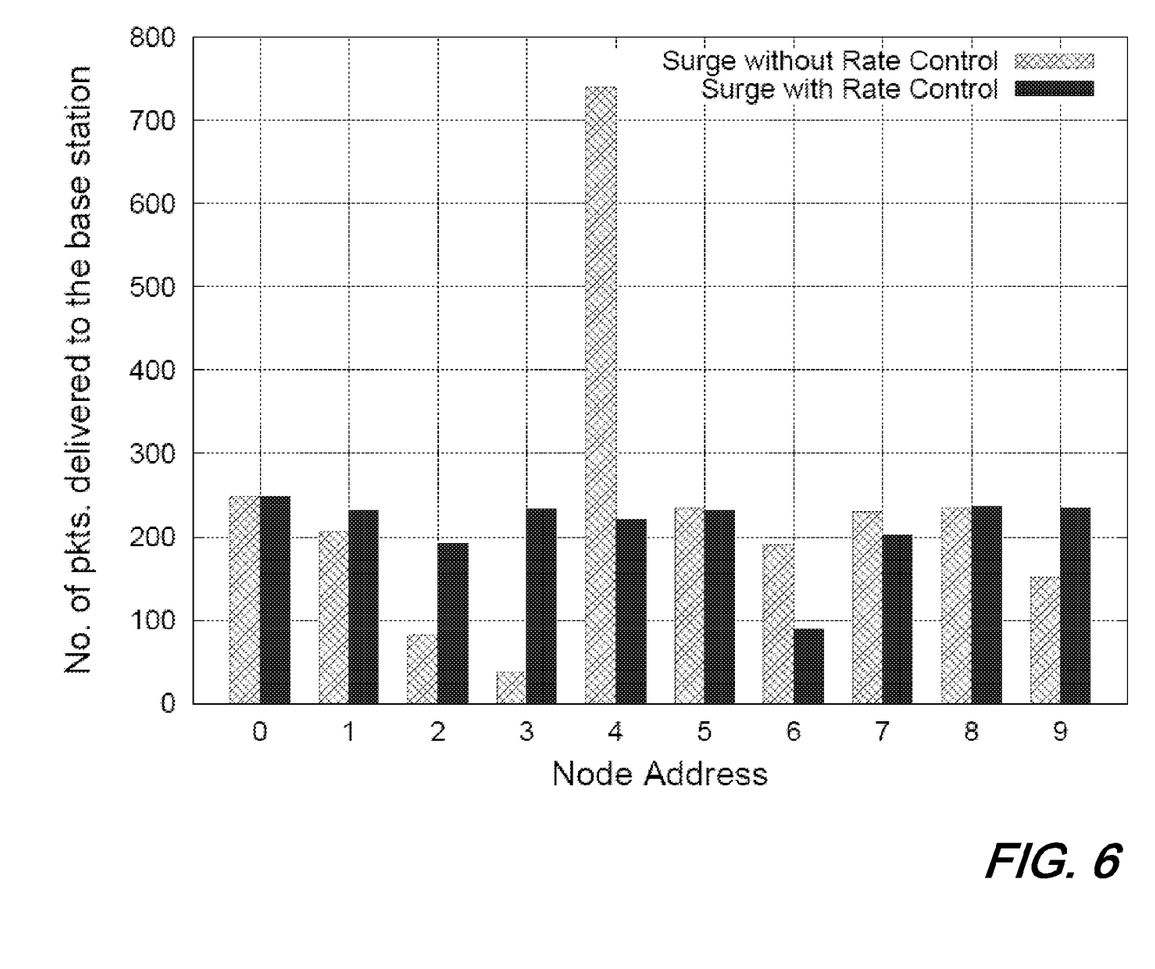
FIG. 6 is a bar graph showing the number of packets delivered to the base station.

FIG. 6 shows the number of packets received at the base station from each node, for both cases. It is easy to see that for plain Surge without rate-control, the rogue node ended up successfully sending almost three times the normal number of data packets. Due to this, nodes 2 and 3, which were close to node 4, were starved of bandwidth which caused the time synchronization module on them to fail, crashing the nodes in the process. As a result, nodes 2 and 3 report a much lower packet count. For Surge with the interposed rate-control scheme, each node successfully delivered approximately the same number of packets to the base station, as seen in the figure. The rate-control scheme was thus able to limit the rogue node's ability to disrupt network operation and ensure fair use of network resources.

CONCLUSION

Ensuring reliable software operation in sensor networks is a crucial problem that cannot be solved by testing in controlled environments using simulation and emulation tools alone and should be done in the real environment. Run-time visibility and control over program execution are two fundamental characteristics that will significantly ease the job of reliable software development in sensor networks. Towards this, we have proposed HERMES, a minimally-intrusive framework based on interposition that enables visibility and control of the in-field execution of sensor systems. HERMES is lightweight and requires no changes to the application software whose execution is to be observed or controlled. Through a prototype implementation using a popular sensor operating system and three realistic case studies, we have demonstrated the flexibility and utility of HERMES in providing support for various operations involved in ensuring reliability in sensor systems.

Accordingly, the invention should be only limited by the scope of the claims attached hereto

TABLE 1

| | | Surge on SOS + HERMES | |
| --- | --- | --- | --- |
| Function call | SOS | Interp. off | Interp. on |
| ker_id | 8 | 40 | 467$_{(Surge)}$ |
| tr_get_hdr_size | 6 | 6 | 112 |
| inter_get_ker_func | N/A | 19 | 23$_{(Kernel)}$ |
| | | 23 | 31$_{(Non\text{-}interposed\ module)}$ |
| | | | 142$_{(Interposition\ module)}$ |
| | | | 347$_{(Interposed\ module)}$ |

TABLE 2

| OS configuration | | Memory usage [bytes] | | | Packets received | | Average packet latency [milliseconds] | |
|---|---|---|---|---|---|---|---|---|
| | | RAM | ROM | Heap | Base Station | Surge Node | Base Station | 1-hop Node |
| Plain SOS | | 100 | 38.248 | 684 | 124 | 110 | 0.6 | 28.8 |
| SOS + HERMES | No inter. module | 100 | 46.580 | 697 | 124 | 109 | 0.8 | 28.9 |
| | Inter. module present, interposition off | 100 | 47.572 | 723 | 124 | 110 | 0.8 | 29.0 |
| | Surge interposed | 100 | 47.572 | 723 | 124 | 107 | 1.2 | 29.4 |
| | Surge. Tree Routing interposed | 100 | 47.572 | 723 | 124 | 109 | 1.3 | 29.8 |

The invention claimed is:

1. A computer-implemented method for monitoring and controlling a network of wireless sensor nodes comprising the steps of:
generating, by a computer, an interposition module for a target module associated with one of said sensor nodes; and
interposing, by the computer, the interposition module between the target module and sensor runtime executing on one of the sensor nodes such that said interposition module may observe and control any interactions to/from the target module;
wherein said interposition module includes customizable computer code and is dynamically interposed between the target module and sensor runtime and is transparent such that it does not alter the target module or use a separate Applications Program Interface (API) for observation, control or redirection of function-level interactions between the target module and the sensor runtime;
wherein said generating step further comprises the steps of:
parsing, by the computer, the target module's source code to determine any specific interfaces that the target module uses to interact with any sensor runtime modules; and
synthesizing, by the computer, a template interposition stub customized for the target module and the specific interfaces used by that module.

2. The computer-implemented method of claim 1 wherein said generating step further comprises the steps of:
packaging, by the computer, the template interposition stub into an interposition binary module.

3. The computer-implemented method of claim 2 wherein said specific interfaces are selected from the group consisting of: functions provided by the target module; handlers for events and messages received from other modules and the runtime; and functions provided by the runtime and other modules that are invoked or otherwise used by the running target module.

4. The computer-implemented method of claim 3 further comprising the steps of:
providing to the runtime by the interposition module executing on a hardware processor, a handler or function corresponding to each handler or function provided by the target module.

5. The computer-implemented method of claim 4 further comprising the steps of:
providing to the target module by the interposition module executing on a hardware processor, a corresponding interface for every function invoked by the target module into the runtime or another module such that the interposition module mimics the runtime from the target module perspective and the target module from the runtime perspective.

6. The computer-implemented method of claim 5 further CHARACTERIZED BY dynamic extensibility wherein interposition modules are included into sensor nodes after deployment of said nodes.

7. The computer-implemented method of claim 4 further comprising the steps of:
providing, to the target module by the interposition module executing on a hardware processor, a corresponding interface for a subset of every function invoked by the target module into the runtime or another module such that the interposition module mimics this subset of the runtime from the target module perspective.

8. The computer-implemented method of claim 4 further comprising the steps of:
selectively enabling/disabling the interposition module in a deployed, running node.

* * * * *